Dec. 23, 1930.  J. B. WATLING  1,785,848
AMUSEMENT DEVICE
Filed March 19, 1925    3 Sheets-Sheet 1

Inventor:
John B. Watling,
by Fisher, Towle, Clapp & Soans
Attys

Dec. 23, 1930.  J. B. WATLING  1,785,848
AMUSEMENT DEVICE
Filed March 19, 1925    3 Sheets-Sheet 2
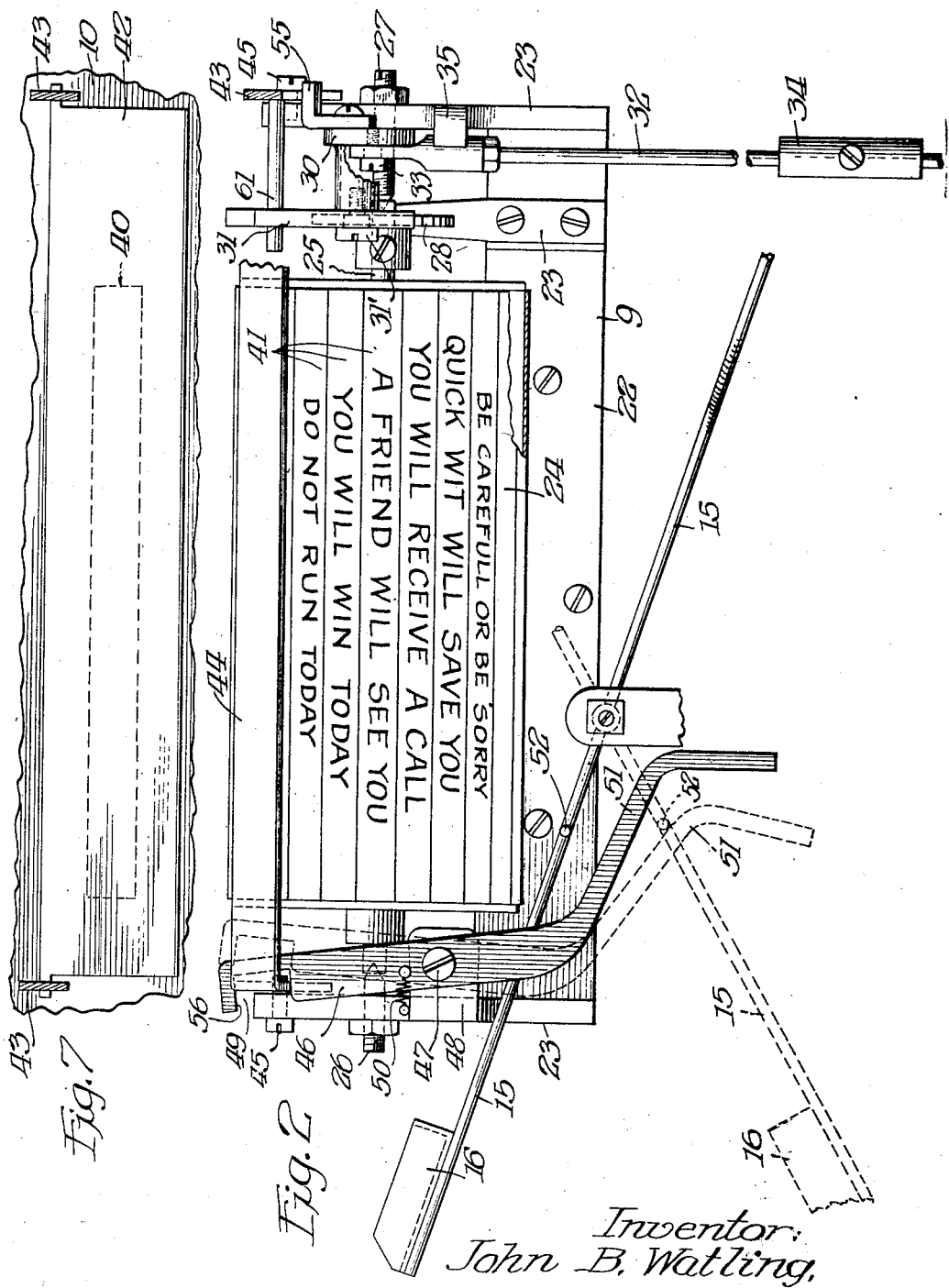
Inventor:
John B. Watling,
by Fisher, Towle, Clapp & Soans
Attys.

Dec. 23, 1930.  J. B. WATLING  1,785,848
AMUSEMENT DEVICE
Filed March 19, 1925    3 Sheets-Sheet 3
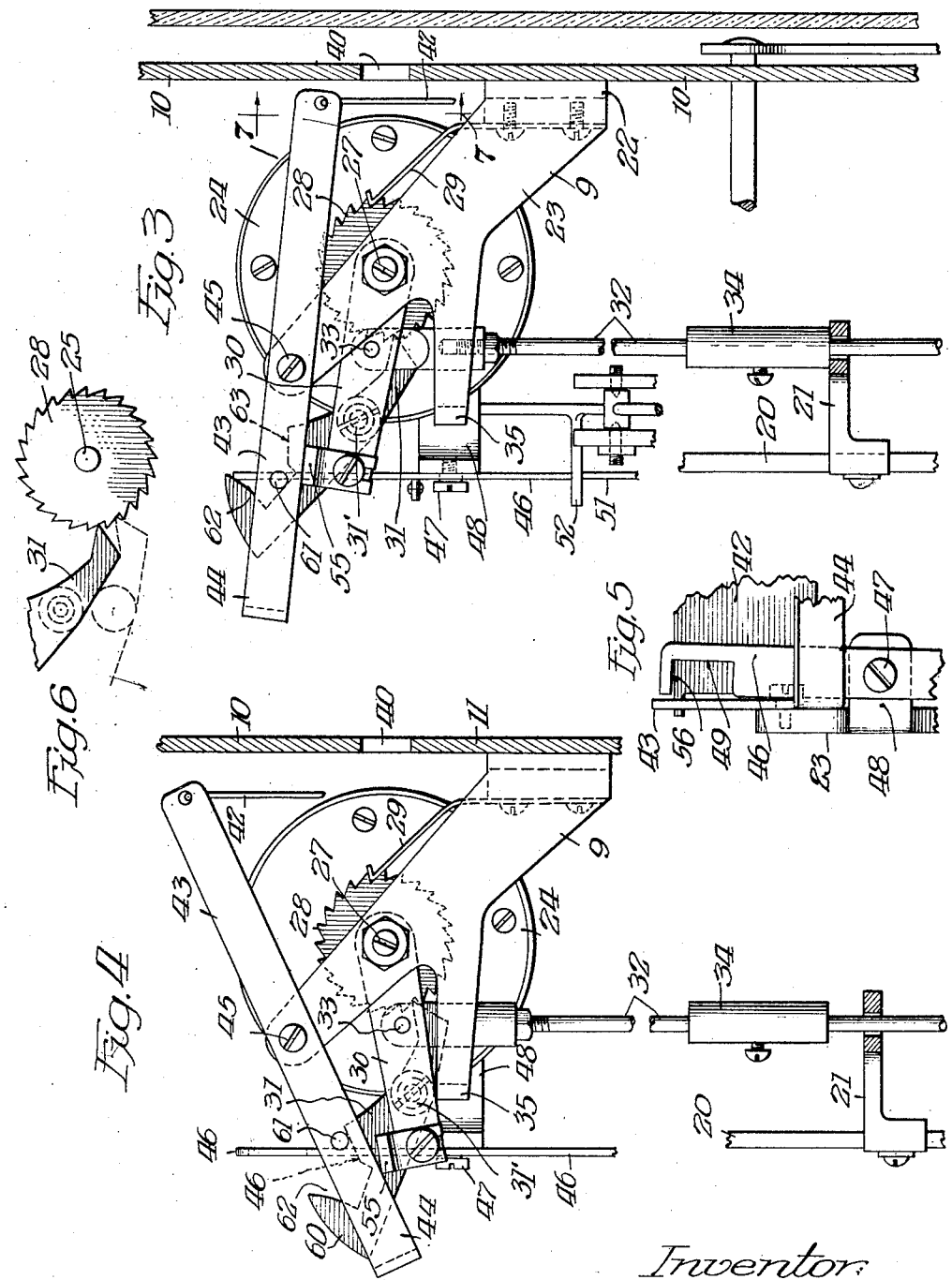

Patented Dec. 23, 1930

1,785,848

UNITED STATES PATENT OFFICE

JOHN B. WATLING, OF CHICAGO, ILLINOIS, ASSIGNOR TO THOMAS W. B. WATLING, OF CHICAGO, ILLINOIS

AMUSEMENT DEVICE

Application filed March 19, 1925. Serial No. 16,628.

This invention relates to amusement devices but more particularly to such as may be used in connection with weighing scales and has for its primary object to provide a simple, durable and ingenious construction of this class.

Further objects of the invention are to provide a display or fortune-telling device which operates in connection with and is controlled by weighing mechanism but which does not exercise any influence on the operation of such mechanism, insofar as the determination of the weight of a person is concerned, to provide a device of this class which cannot be injured by abuse inflicted on the weighing mechanism, to prevent unauthorized operation of the device, to cause the device to operate in a systematic manner, and in general to provide an improved fortune-telling attachment for a weighing scale.

The present embodiment of my invention which I have chosen to illustrate the principles thereof is a fortune-telling device incorporated in a weighing-scale of the type forming the subject matter of my Patent No. 1,680,579, dated August 14, 1928, and reference may be had thereto for a full description of the construction and mode of operation.

The further objects and advantages of my invention will be better understood by reference to the following specification when considered in connection with the accompanying drawings illustrating a selected embodiment thereof, in which:—

Fig. 2 is an enlarged rear view of the device.

Fig. 3 is an end elevation, the parts being in their normal or locked position.

Fig. 4 is the same as Fig. 3, except that the parts are in released or displaying position.

Fig. 5 is a partial rear elevation, the position of the parts corresponding to Fig. 3.

Fig. 6 is a detail view, and

Fig. 7 is a vertical section on the line 7—7 of Fig. 3.

Figure 1:
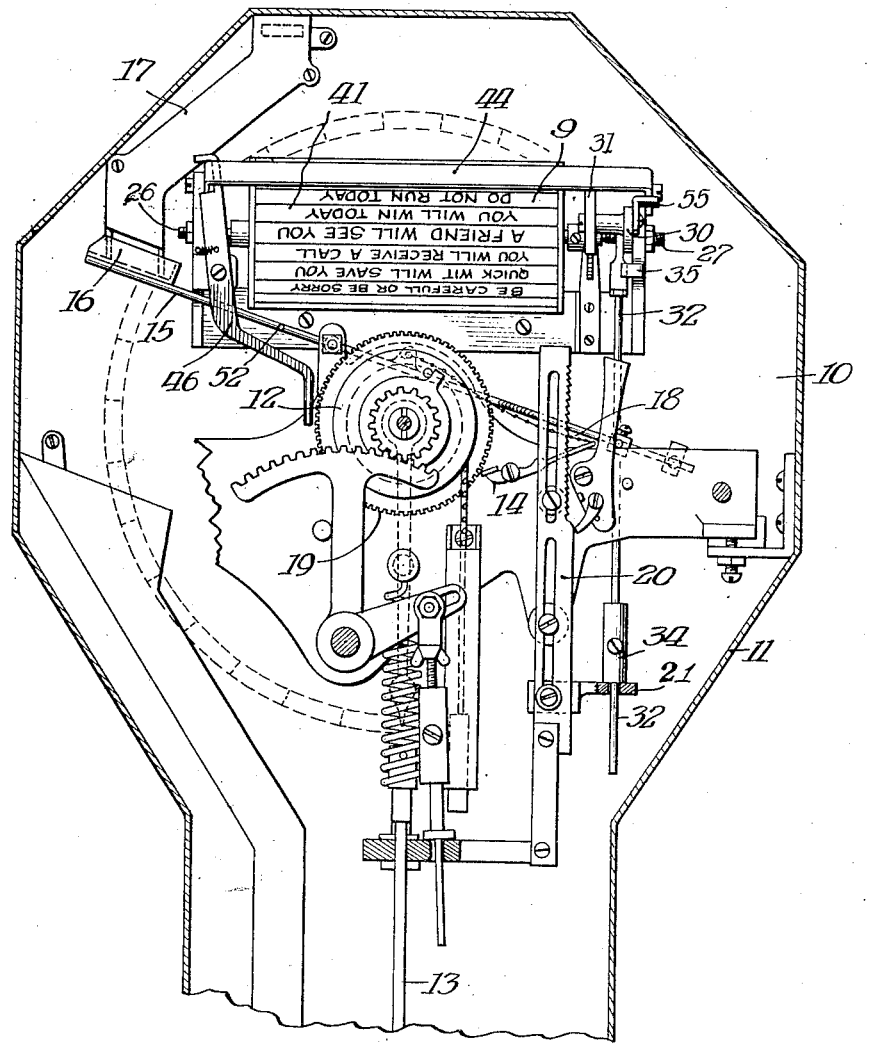
Fig. 1 is a rear elevation of the device incorporated in the weighing mechanism.

Referring to the drawings, the fortune-telling device 9 is mounted on the rear face of the front wall 10 of the scale casing 11, preferably above the weighing mechanism 12. This mechanism is operated by a vertical rod 13 connected to the usual weighing platform (not shown) and controlled by a locking dog 14. The locking dog is adapted to be released by a trip lever 15 provided at its outer end with a coin pocket 16 normally disposed beneath the usual coin slot 17 in the position indicated in Fig. 1. A chain 18 connects this dog 14 with the lever 15 so that the depression of the pocket 16 by a coin will cause the dog to be moved out of engagement with the toothed disk 19. A vertical slide plate 20 is mounted on the frame of the weighing mechanism and connected to the rod 13 so that vertical movement of the rod will cause a corresponding movement of the plate. A horizontally disposed arm 21 is attached to this plate and co-acts with the fortune-telling device in the manner which will be presently described.

The scale mechanism which is shown in part in this application is fully described in my patent above referred to.

The fortune-telling device 9 is supported by a frame 22 screwed or otherwise fastened to the wall 10 and provided with a pair of brackets 23 arranged on opposite sides of a horizontally disposed indicating cylinder 24. This cylinder is mounted on a shaft 25 supported at its ends by and revoluble on adjustable pivot screws 26 and 27 extending through their respective brackets. A ratchet wheel 28 is secured on this shaft and a spring arm 29 engages the periphery of this wheel to yieldingly resist the rotation of the cylinder and prevent spinning of the same.

An arm 30 is pivoted at its inner end on the screw 27 and a dog 31 is similarly mounted on this arm at 31' to actuate the ratchet wheel 28. A pull rod 32 is pivotally connected to this arm at 33 and a weight 34 is adjustably attached to the rod so that when this weight is released in the manner which will be presently described, the rod will cause the dog to actuate the ratchet wheel and rotate the indicating cylinder. A stop arm 35 is provided on the bracket to limit the downward swing of the arm 30.

The front wall 10 of the casing is provided with an opening or window 40 of sufficient size to permit one of the lines of reading matter as 41 on the cylinder 24 to be read therethrough. A shutter 42 is normally disposed in rear of this window to conceal the cylinder. This shutter in the present embodiment is suspended at its upper corners from the outer extremities of forwardly projecting arms 43 of a substantially U-shaped member 44 which is trunnioned on the bracket 23 as at 45, 45. A latch 46 is pivotally mounted at 47 on an arm 48 on one of the brackets 23 to engage the corresponding arm 43 of the member 44. This latch 46 is provided with a notch 49 to receive the arm when such arm is in the position of closed shutter, as indicated in Figs. 2 and 3. This latch is yieldingly held in position to engage the arm by a spring 50 connecting the arm with the bracket. The latch is provided with an extension as 51 which projects downwardly and inwardly (Fig. 2) from the lower end thereof and is adapted to be engaged by a pin 52 on the trip lever 15 when such lever is operated by a coin falling into the pocket 16. The engagement of this pin causes the latch to be moved into the dotted position (Fig. 2) and to release the member 44. As soon as the member 44 is thus released, the weight of the inner portion thereof causes the member to swing into the position of Fig. 4, lifting the shutter and permitting the line of printed matter on the cylinder to be read by the person standing on the weighing platform. This swinging movement of the member 44 is limited by a stop 55 on the outer extremity of the arm 30. The swinging movement of this member in the opposite direction is limited by the shoulder 56 on the latch as the spring 50 causes the latch to move into engagement as soon as the arm of the member has moved sufficiently to permit it to enter the notch 49.

The dog 31 is provided with an extension 60 which co-acts with an inwardly projecting pin 61 (Fig. 2) on one of the arms 43 of the member 44. The upper face of this extension is notched as at 62 to permit the spur of the dog to move out of engagement with one tooth of the ratchet wheel as the inner portion of the member 44 is raised, and to engage the next tooth. The relative position of these parts at the start of the upward movement is indicated in Fig. 4 and the final position in Fig. 3. The outer or extension portion of the dog acts as a weight to normally press the spur toward the ratchet wheel. It will be noted that in the starting position the pin 61 is in contact with the inclined edge 63 of the dog. An upward movement of the rod 20 will raise the pivot pin 31' on which the dog is mounted, drawing the spur of the dog out of one tooth notch and at the same time causing the extension of the dog through the medium of the pin 61 to raise the inner portion of the member 44. Before the spur has passed the next notch in the ratchet wheel, the upward movement of the member 44 will have been stopped by the shoulder 56 of the latch, thus preventing further advance of the dog on the ratchet wheel. The next downward movement of the pull rod will therefore cause the ratchet wheel to rotate one tooth distance. One fortune or other line of printed matter on the cylinder is provided for each tooth on the ratchet so that such printed matter will be advanced one line every time that the pull rod is depressed. However, the printed matter opposite the window will not be exposed to view unless a coin is dropped into the pocket 16 to release the member 44 and cause the shutter to be raised.

The downward movement of the pull rod which causes the cylinder to be rotated is produced by the weight 34 thereon. When a person steps on the weighing platform the arm 21 is drawn downward with the slide plate 20, thus permitting the weight 34 to draw the pull rod 32 downwardly. This downward movement of the rod is preferably relatively slight or just sufficient to cause the dog 31 to rotate the ratchet wheel one tooth distance. The extent of downward movement of the arm 21 depends upon the weight of the person on the weighing platform but in all cases is greater than the permitted movement of the weight 34 so that neither this weight nor any of the parts of the fortune-telling device exercise the slightest influence on the operation of the weighing mechanism insofar as the determination of the weight of a person is concerned. This is important. When the person steps off the platform the rod 13 is released and the scale parts return to normal. The arm 21 rises into contact with the under face of the weight and then lifts this weight and the pull rod 32 sufficiently to advance the dog one tooth distance on the ratchet wheel in the manner described.

The position of the weight 34 on the rod 32 is preferably adjusted so that the arm 21 will have reached its highest position when the upward movement of the rod is stopped by the contacting of the member 44 with the shoulder 56 on the latch. This weight method of operating the indicating cylinder is particularly advantageous as it prevents the fortune-telling device from effecting the correct operation of the weighing mechanism which would be likely to occur if the device were directly connected to such mechanism. It has the further advantage of protecting the device from injury resulting from abuse of the scale. In this connection it should be kept in mind that these coin-controlled scales are placed in public places frequently without protection and are subjected to severe abuse, particularly by persons jumping on the weighing platform.

The shutter cannot be lifted to expose the indicating cylinder except by the insertion of a coin in the slot provided for the purpose. It is impossible to obtain more than one fortune-telling for a single coin as the movement of the dog to engage another tooth on the ratchet wheel causes the shutter to be lowered in front of the window and before this dog has reached the position of engagement, the latch has engaged the member 44 and locked the shutter in closed position.

I am aware that the form and arrangement of parts may be varied without departing from the spirit of my invention, and I reserve the right to make all such as fairly fall within the scope of the following claims.

I claim as my invention:

1. In a device of the class described, the combination with a coin controlled weighing scale and a casing having an opening therein, of a revoluble indicating cylinder within said casing opposite said opening, a shutter normally disposed in position opposite said opening to conceal said cylinder, means controlled by the coin control mechanism for moving the shutter into position to expose said cylinder, and weight actuated means normally restrained by the weighing mechanism and released thereby during the weighing operation for rotating said cylinder.

2. In a device of the class described, the combination of a coin controlled weighing scale and a casing having an opening therein, of a revoluble indicating cylinder within the casing and exposed by the opening, a shutter normally closing the opening to conceal the cylinder, means controlled by the coin control mechanism for moving the shutter away from the opening to permit inspection of the cylinder, and weight actuated means operating substantially independently of the weighing mechanism but normally restrained by the weighing mechanism and released thereby during the weighing operation for rotating said cylinder.

3. In a device of the class described, the combination with a weighing scale and a casing having an opening therein, of a revoluble indicating cylinder within said casing opposite said opening, a shutter movable into position opposite said opening to conceal said cylinder, means for controlling said shutter, and means operable upon operation of the scale for actuating said cylinder including a ratchet, a dog co-acting with said ratchet, a weight connected to said dog and means operable by the scale while regaining its normal position for lifting the weight to place the cylinder actuating means in operative position.

4. In a device of the class described, the combination with a platform weighing scale and a casing having an opening therein, of a revoluble indicating cylinder within said casing opposite said opening, a shutter movable into position opposite said opening to conceal said cylinder, means for controlling said shutter, and means operable upon a person stepping on the platform for imparting a step by step rotation of said cylinder including a ratchet, a dog co-acting with said ratchet, a weight connected to said dog and means operable by the scale while regaining its normal position for lifting the weight to place the cylinder actuating means in operative position.

5. The combination with weighing mechanism, of fortune telling mechanism controlled by the weighing mechanism and comprising a revoluble indicating cylinder, means operating independently of the weighing mechanism for rotating said cylinder, and a weight associated with said means for actuating the same, the operation of said weight being normally restrained by the weighing mechanism and released thereby during the weighing operation.

6. The combination with weighing mechanism, of fortune-telling mechanism controlled by said weighing mechanism and comprising a revoluble indicating cylinder, and means including a weight for rotating said cylinder, said weight being returned to raised position by said weighing mechanism after each operation of said fortune-telling mechanism.

7. The combination with weighing mechanism, of fortune-telling mechanism controlled by said weighing mechanism and comprising a revoluble indicating cylinder, and means including a weight for imparting to said cylinder a step by step rotation, said weight being returned to raised position by said weighing mechanism after each step of advance of said cylinder.

8. The combination of weighing mechanism and fortune-telling mechanism controlled thereby and including a revoluble indicating cylinder, gravity-actuated mechanism associated with said weighing mechanism for operating said cylinder upon operation of said weighing mechanism, and means operable by the scale for restoring said gravity actuated means to operative position while the scale is returning to normal position.

9. In a device of the class described, the combination with a coin controlled weighing scale having a platform and a casing having an opening therein, of a revoluble indicating cylinder within said casing opposite said opening, a shutter movable into position opposite said opening to conceal said cylinder, means controlled by the coin control for opening the shutter, and means operable upon the depression of the platform of the scale for rotating said cylinder.

10. In a device of the class described, the combination with a weighing scale and a casing having an opening therein, of a revoluble indicating cylinder within said casing opposite said opening, a shutter movable into position opposite said opening to conceal said cylinder, means operable upon insertion of a coin to operate the scale for controlling said shutter, and means operable upon insertion of a coin to operate the scale for imparting to said cylinder a step by step rotation.

11. The combination with weighing mechanism, of fortune-telling mechanism controlled by said weighing mechanism and comprising a revoluble indicating cylinder, a ratchet wheel in conjunction with said cylinder, a dog adapted to engage the ratchet wheel, and means including a weight for moving said dog to impart to said cylinder a step-by-step rotation, said weight being returned to raised position by said weighing mechanism after each step of advance of said cylinder.

12. The combination with weighing mechanism, of fortune telling mechanism controlled by said weighing mechanism and comprising a revoluble indicating cylinder, a ratchet wheel cooperating with said cylinder, a dog adapted to engage the ratchet wheel, and means including a weight for moving said dog to impart to said cylinder a step-by-step rotation, said weight being returned to raised position by said weighing mechanism after each step of advance of said cylinder, and spring means for exerting a constant drag on said ratchet wheel and cylinder.

13. In a platform scale of the class described, the combination with a weighing scale provided with a casing having an opening therein, of a revoluble indicating cylinder within said casing and opposite said opening, a shutter movably disposed opposite said opening, means having potential energy when in inoperative condition for removing said shutter from said opening, means normally retaining said shutter in position to close said opening when said scale is inoperative, means controlled by said weighing scale when a weight is placed thereon for releasing said shutter-removing means and for imparting a systematic rotation to said cylinder, and means operative when a weight is removed from said scale for replacing said shutter opposite said opening and for restoring said cylinder actuating means to a condition for again rotating said cylinder.

14. In a platform scale of the class described, the combination with a weighing scale provided with a casing having an opening therein, of a revoluble indicating cylinder within said casing and opposite said opening, a shutter movably disposed opposite said opening, means having potential energy when in inoperative condition for removing said shutter from said opening, means normally retaining said shutter in position to close said opening when said scale is inoperative, means having potential energy when said scale is in inoperative condition for releasing said shutter-removing means and for imparting a systematic rotation to said cylinder, and means operative when a weight is removed from said scale for restoring said last-named means to its original condition of potential energy and for replacing said shutter opposite said opening.

15. In a device of the class described, the combination with a weighing scale provided with a casing having an opening therein, of a revoluble indicating cylinder within said casing and opposite said opening, a shutter movably mounted opposite said opening to conceal said cylinder, coin-controlled means having potential energy when said scale is in inoperative condition and operable when a weight is placed on said scale for releasing said shutter-removing means and for imparting a systematic rotation to said cylinder, means normally retaining said shutter in position to close said opening when said scale is inoperative, and means operable when a weight is removed from said scale for replacing said shutter opposite said opening and for restoring said cylinder actuating means to a condition for another operation.

16. The combination with a weighing mechanism, of fortune-telling mechanism controlled by said weighing mechanism and comprising a revoluble indicating cylinder, means for imparting a step-by-step rotation to said cylinder whereby said cylinder will be rotated a single step for each operation of said weighing mechanism, said fortune-telling mechanism comprising also a member having potential energy, means normally retaining said last-named member when said scale is not in operation and acting to release said potential energy member when a weight is placed on the weighing mechanism, said potential energy member acting independently of said weighing mechanism when released.

17. The combination with a weighing mechanism, of fortune-telling mechanism controlled by said weighing mechanism and comprising a revoluble indicating cylinder, means for imparting a step-by-step rotation to said cylinder whereby said cylinder will be rotated a single step for each operation of said weighing mechanism, said fortune-telling mechanism comprising also a weight, means normally retaining said weight when said scale is not in operation and acting to release said weight when a weight is placed on the weighing mechanism, said last-named means restoring said first-mentioned weight to its original position when the last-mentioned weight is removed from the weighing mechanism, and said first-mentioned weight acting independently of said weighing mechanism when released.

18. The combination with a weighing mechanism, of fortune-telling mechanism controlled by said weighing mechanism and comprising a revoluble indicating cylinder, means for imparting a systematic rotation to said cylinder, comprising a member having potential energy, means normally retaining said last-named member when said scale is not in operation and serving to release said potential energy member when a weight is placed on the weighing mechanism, said last-named means also serving to restore said potential energy member to its original condition of potential energy when the weight is removed from the weighing mechanism, and said potential energy member acting independently of said weighing mechanism when released.

19. The combination with a weighing mechanism, of fortune-telling mechanism controlled by said weighing mechanism and comprising a revoluble indicating cylinder, means for imparting a step-by-step rotation to said cylinder and advancing said cylinder only a single step for each operation of said weighing mechanism, said last-named means comprising a member having potential energy, means normally retaining said last-named member when said weighing mechanism is not in operation and serving to release said potential energy member when a weight is placed on the weighing mechanism, said last-named means also serving to restore said potential energy member to its original condition of potential energy when the weight is removed from the weighing mechanism, and said potential energy member acting independently of said weighing mechanism when released.

JOHN B. WATLING.